W. E. SHERWOOD.
VEHICLE WHEEL.
APPLICATION FILED MAR. 15, 1919.
1,369,847. Patented Mar. 1, 1921.
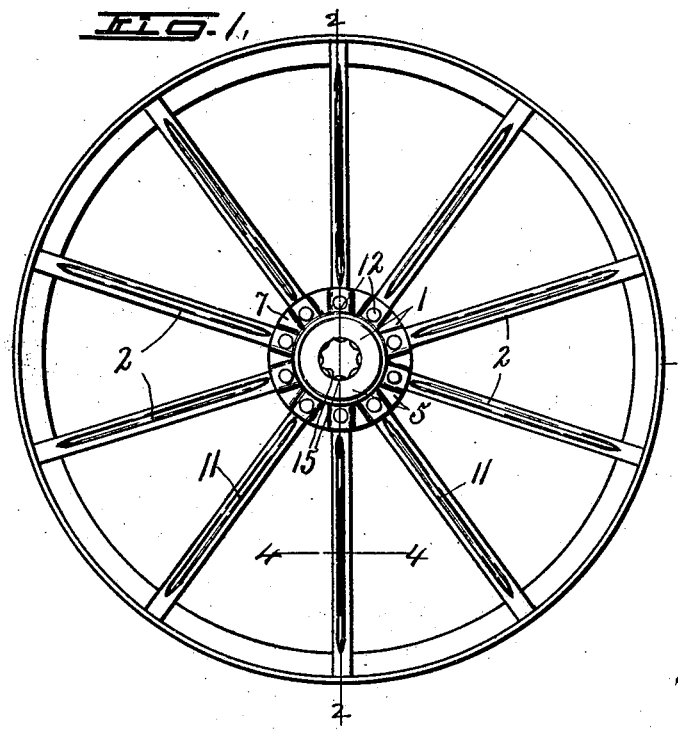
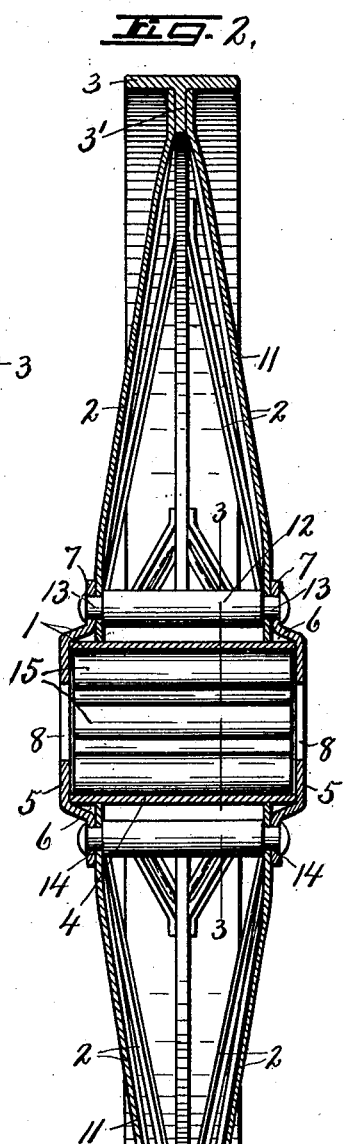
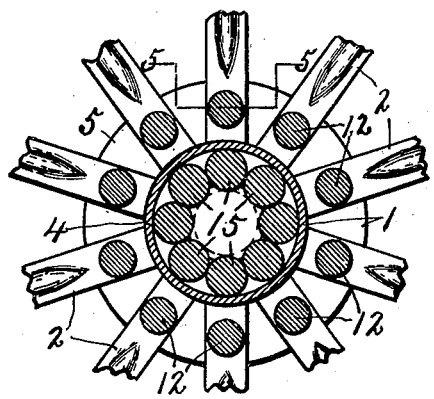
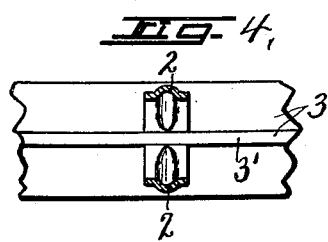
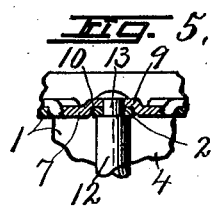
INVENTOR
W. E. Sherwood
BY Howard R. Denison
ATTORNEY

UNITED STATES PATENT OFFICE.

WILLIAM E. SHERWOOD, OF CANASTOTA, NEW YORK, ASSIGNOR TO SHERWOOD BROTHERS MANUFACTURING COMPANY INC., OF CANASTOTA, NEW YORK, A CORPORATION OF NEW YORK.

VEHICLE-WHEEL.

1,369,847.          Specification of Letters Patent.          Patented Mar. 1, 1921.

Application filed March 15, 1919. Serial No. 282,858.

*To all whom it may concern:*

Be it known that I, WILLIAM E. SHERWOOD, of Canastota, in the county of Madison in the State of New York, have invented new and useful Improvements in Vehicle-Wheels, of which the following, taken in connection with the accompanying drawings, is a full, clear, and exact description.

This invention relates to certain improvements in vehicle wheels, the objects being lightness, strength, durability and economy of manufacturing and assembling, and at the same time to make suitable provisions for the reception and retention of a series of roller bearings in the hub for reducing friction upon the supporting axle (not shown).

Other objects and uses relating to specific parts will be brought out in the following description.

In the drawings—

Figure —1— is an end view of a vehicle wheel embodying the various features of my invention.

Fig. —2— is an enlarged sectional view on line 2—2, Fig. —1—.

Fig. —3— is a detail sectional view taken on the plane of line 3—3, Fig. —2—.

Fig. —4— is a detail sectional view through one of the spokes taken on line 4—4, Fig. —1—.

Fig. —5— is a detail sectional view taken on line 5—5, Fig. —3—.

As illustrated this wheel comprises a hub —1— spokes —2—, and a rim —3— all of which are made of relatively light sheet or rolled metal.

The hub —1— consists of a tubular cylindrical shell —4— and similar end heads or caps —5— applied to the opposite ends of the cylindrical shell —4— and held in place in a manner hereinafter described.

The shell —4— is made of sheet metal and is therefore of uniform thickness throughout its area.

The end heads or caps —5— are identical and interchangeable each consisting of a circular cup-shaped disk of sheet metal of greater diameter than that of the shell —4—, the center portions thereof being pressed outwardly to form circular chambers —6—, and annular flanges —7—, the peripheral walls of the chambers —6— being slightly tapered outwardly to a diameter substantially equal with that of the adjacent ends of the tubular shell —4— over and upon which they are adapted to tightly fit when the heads are drawn toward each other against the end of the tube.

The center outwardly pressed portions of the heads or caps —5— extend radially across and abut against the ends of the tube —4—, and are provided with central openings —8— for receiving a shaft or axle (not shown).

The flanges —7— of both heads are substantially radial and parallel when assembled upon the ends of the tube —4— portions of each flange at regular intervals throughout its circumference length being struck up or pressed outwardly —9— along radial lines to form radial channels —10— in its inner face for the reception and retention of the adjacent ends of the spokes —2—.

That is, the circumferential width of the channels —10— and adjacent ends of the spokes —2— are substantially equal, while the axial depth of the channels is substantially equal to the thickness of the spokes, so that when the inner ends of the spokes are assembled in the channels they are held radially against circumferential displacement by the walls thereof.

These channels —10— are spaced uniform distances apart circumferentially, and when the heads —5— are assembled upon the ends of the tube —4— the channels —10— of both are axially alined to permit the spokes —2— to be assembled in pairs or directly opposite each other.

The spokes —2— are also made of sheet metal, and are preferably ribbed longitudinally at —11— between the hub and rim for reinforcing purposes, the ribs being formed by pressing the longitudinal centers of the spokes beyond their edges.

The inner ends of the opposite sets of the spokes which are seated on the channels —10— are preferably parallel and abut against the periphery of the tubular hub section —4—, said ends being curved circumferentially to conform to the curvature of said tubular hub section, and thereby assist in holding the spokes in their radial positions.

It is now clear that the inner ends of the spokes of each pair and are spaced equal distances from and at opposite sides of the transverse center of the hub and abut against the inner faces of the flanges —7— in axial alinement with each other, and are firmly held in this position by stay bolts or spacing members —12—, having reduced ends —13— passing through registering apertures —14— in the flanges —7— and adjacent portions of the spokes —2—, as shown more clearly in Figs. —2— and —5—, the reduced ends —13— of the stay bolts forming shoulders abutting against the inner faces of the spokes —2— to hold the latter firmly in the inner faces of the flanges —7—, the outer ends of the registering portions —14— being upset or riveted against the outer faces or flanges —7— to firmly secure the inner ends of the spokes to the end heads —5—, and at the same time firmly holding said heads against the ends of the tube —4—.

The main bodies of the spokes of each pair converge outwardly from the flanges —7— toward the rim —3— at substantially equal angles with the central plane of the wheel and axis thereof, the outer ends of said spokes abutting against the inner face of the rim —3— at opposite sides of the circumferential flange —3—, which forms an integral part of said rim, as shown in Figs. —1— and —2—, the outer end faces of the spokes being curved circumferentially to conform to the inner face of the rim —3— and to assure greater rigidity of connection between the rim and spokes.

The outer ends of the spokes of each pair are secured preferably by spot welding to opposite faces of the flange —3'— of the rim —3— for firmly holding the rim in concentric relation to the hub.

A plurality of anti-friction rollers —15— are assembled circumferentially within the tubular hub section —4— between the end heads or caps —5— in such a manner as to be self-retaining against inward radial displacement by bearing one against the other, and against the inner face of the shell —4—, leaving a central opening of sufficient size to receive the shaft or axle (not shown), the diameter of the several rollers being sufficient to cause their inner faces to project slightly beyond the walls of the opening —8— on the end heads —5— to allow them to bear upon the shaft without friction between said shaft and the walls of the openings —8—.

In assembling the parts of the wheels one of the heads or disks —5— may be laid upon a flat support with its concave side uppermost after which the tube —4— may be inserted in the recess, and the spokes at the adjacent end seated in their respective channels —10— and held therein by placing the bolts —12— in operative position.

The rim —3— may then be placed upon the upper faces of the outer ends of the lower set of spokes after which the other set of spokes may be placed in operative position upon the upper reduced ends of the bolts —12—.

The rollers —15— may then be inserted in position after which the upper cap —5— is placed in operative position, the ends of the bolts being then riveted to firmly lock the caps to the ends of the tube, and the spokes to the inner faces of the caps, whereupon the outer ends of the spokes may be spot welded to the outer faces of the flange —3'— of the rim.

This manner of assembling the parts enables the wheel to be put together strongly within a comparatively short time, and with a minimum amount of labor, and at the same time produces an exceptionally strong wheel from comparatively light sheet metal.

What I claim is:—

1. A vehicle wheel comprising a tubular hub section, a series of spacing members arranged circumferentially around the hub section parallel with the axis thereof, spokes abutting against opposite ends of the spacing members and having their inner ends abutting against the periphery of the hub section, a series of rollers arranged within the hub section and opposite end heads abutting against the adjacent ends of the hub section and extending inwardly across portions of the corresponding ends of the rollers to hold the latter against endwise displacement, said heads extending inwardly around the periphery of the adjacent ends of the hub section and engaged with the outer faces of the spokes, said spacing members having means for securing the end heads of the outer faces of the spokes and adjacent portions of the spokes to the spacing members, and a rim secured to the outer ends of the spokes.

2. In a vehicle wheel of the character described a tubular hub section, opposite end heads having sockets in their adjacent faces fitting closely upon the ends of the tube, spokes resting against the inner faces of the heads and abutting against the periphery of the tube, tie-bolts having reduced ends passed through registering apertures in the heads and spokes and forming shoulders abutting against the inner faces of the spokes, the outer ends of said bolts being riveted against the outer faces of the heads to clamp the spokes to the heads, and the heads to the ends of the tubular hub section, and a rim secured to the outer ends of the spokes.

3. In a vehicle wheel of the character described the combination of a tubular hub section, opposite end heads having tapered sockets in their adjacent faces wedging upon the ends of the hub section, said heads being provided with radial channels in their inner faces, spokes seated in said channels, tie bolts having reduced ends passed through registering apertures in the spokes and heads forming shoulders abutting against the inner faces of the spokes, the outer ends of said tie bolts being riveted against the outer faces of the heads, and a rim having an inwardly projecting circumferential flange between the outer ends of the opposite sets of spokes, said outer ends of the spokes being spot welded to said flange.

In witness whereof I have hereunto set my hand this 11th day of March, 1919.

WILLIAM E. SHERWOOD.

Witnesses:
H. E. CHASE,
ANNA G. JORDAN.